United States Patent
Eckardt et al.

(10) Patent No.: US 8,655,460 B2
(45) Date of Patent: Feb. 18, 2014

(54) METHOD FOR OPERATING A DRIVE CONTROL DEVICE AND DRIVE CONTROL DEVICE OPERATING ACCORDING TO THE METHOD

(75) Inventors: Dieter Eckardt, Herzogenaurach (DE); Hans-Peter Krätz, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/472,169

(22) Filed: May 15, 2012

(65) Prior Publication Data
US 2013/0131835 A1   May 23, 2013

(30) Foreign Application Priority Data
May 16, 2011   (EP) ..................................... 11166214

(51) Int. Cl.
*G05B 11/01*   (2006.01)
(52) U.S. Cl.
USPC ............................................. 700/11; 363/55
(58) Field of Classification Search
USPC .......................................................... 700/11
See application file for complete search history.

(56) References Cited

U.S. PATENT DOCUMENTS

| | | | |
|---|---|---|---|
| 5,045,988 A | 9/1991 | Gritter | |
| 5,744,928 A * | 4/1998 | Tang et al. | ..................... 318/610 |
| 6,028,411 A * | 2/2000 | Motzko et al. | ................ 318/606 |
| 6,745,083 B2 | 6/2004 | Eckardt et al. | |
| 6,822,408 B2 | 11/2004 | Eckardt et al. | |
| 6,999,326 B2 | 2/2006 | Eckardt et al. | |
| 7,026,783 B2 | 4/2006 | Eckardt | |
| 7,327,053 B2 | 2/2008 | Eckardt et al. | |
| 7,466,020 B2 | 12/2008 | Eckardt et al. | |
| 8,159,373 B2 * | 4/2012 | Markram | ......................... 341/50 |
| 2003/0173918 A1 | 9/2003 | Eckardt et al. | |
| 2004/0022004 A1 * | 2/2004 | Habuka et al. | ................ 361/119 |
| 2004/0093357 A1 | 5/2004 | Eckardt et al. | |
| 2007/0291518 A1 | 12/2007 | Eckardt | |
| 2008/0266915 A1 | 10/2008 | Eckardt | |
| 2009/0039818 A1 | 2/2009 | Eckardt | |
| 2013/0051088 A1 * | 2/2013 | Yamashita | .................. 363/21.13 |

* cited by examiner

*Primary Examiner* — Kavita Padmanabhan
*Assistant Examiner* — Michael J. Scapin
(74) *Attorney, Agent, or Firm* — Henry M. Feiereisen LLC

(57) ABSTRACT

A drive control device having an inverter with semiconductor switches controlled by control signals is operated by calculating with a control logic a control signal time instant for each control signal, transmitting during operation the control signal time instants with the control logic during switching pauses of the semiconductor switches from a low-voltage side of the drive control device to a high-voltage side of the drive control device having the inverter, and generating the control signals for controlling the semiconductor switches on the high-voltage side based on the transmitted control signal time instants.

8 Claims, 4 Drawing Sheets

METHOD FOR OPERATING A DRIVE CONTROL DEVICE AND DRIVE CONTROL DEVICE OPERATING ACCORDING TO THE METHOD

CROSS-REFERENCES TO RELATED APPLICATIONS

This application claims the priority of European Patent Application EP11166214, filed May 16, 2011, pursuant to 35 U.S.C. 119(a)-(d), the content of which is incorporated herein by reference in its entirety as if fully set forth herein.

BACKGROUND OF THE INVENTION

The present invention relates to a method for operating a drive control device and a drive control device operating according to the method, as well as to a computer program for implementing the method and accordingly also to a drive control device having means for executing such a computer program. The invention relates most particularly to a method for operating a drive control device, wherein the latter has an inverter and wherein said inverter comprises semiconductor switches which can be controlled by means of control signals.

The following discussion of related art is provided to assist the reader in understanding the advantages of the invention, and is not to be construed as an admission that this related art is prior art to this invention.

Drive control devices of the aforesaid type are known per se. As a result of the control implemented by means of the control signals the inverters generate an output voltage having variable frequency and voltage. By this means it is possible to adjust and regulate the rotational speed and the torque of e.g. an electric motor as the load of the drive control device. Control electronics for generating the control signals are disposed on a low-voltage side of the drive control device and the inverter is in contrast located on a high-voltage side. An electrical isolation means is provided between the low-voltage side and the high-voltage side for safety reasons. The control signals must nonetheless be transmitted over and beyond said electrical isolation. A serial transmission, inter alia, has been considered for this purpose. A disadvantageous aspect with this approach, however, is that displacement currents can be produced between the high- and low-voltage sides due to high voltage rates of rise during switching of the semiconductor switches. Said currents interfere with the signal transmission and can result in a situation in which it is no longer possible to control the semiconductor switches properly. In order to solve said problem, consideration has been given in the prior art to limiting the bandwidth of the serial transmission to such an extent that an adequate signal-to-noise ratio is established. Security measures, e.g. a telegram repetition, are implemented for other possible sources of interference that may occur, although such measures ultimately have a negative impact on the bandwidth. A separate transmission of the individual control signals is also considered as an alternative. This however means implementing a separate electrical isolation for each control signal, so this alternative turns out to be inflexible and costly.

It would therefore be desirable and advantageous to obviate prior art shortcomings and to provide an improved method for operating a drive control device and a drive control device operating according to the method.

SUMMARY OF THE INVENTION

According to one aspect of the present invention, a method for operating a drive control device having an inverter with semiconductor switches controlled by control signals includes the steps of calculating with a control logic a control signal time instant for each control signal, during operation, transmitting the control signal time instants with the control logic during switching pauses of the semiconductor switches from a low-voltage side of the drive control device to a high-voltage side of the drive control device having the inverter, and generating the control signals for controlling the semiconductor switches on the high-voltage side based on the transmitted control signal time instants. The method may be implemented in software.

According to another aspect of the invention, a drive control device includes control logic, a control circuit connected to the control logic for communication, and an inverter with semiconductor switches controlled by control signals, wherein the control logic is configured to calculate control signal time instants controlling the semiconductor switches, to determine switching pauses of the semiconductor switches based on the calculated control signal time instants, to transmit the control signal time instants to the control circuit during the switching pauses, and to generate the control signals for controlling the semiconductor switches based on the control signal time instants and a time information.

According to another aspect of the invention, the method may be performed with a computer program having program code stored on a non-transitory medium, wherein the program code, when loaded into a drive control device having an inverter with semiconductor switches controlled by control signals and executed on the drive control device. The invention also relates to a data medium with the computer program stored thereon.

Because the control signal time instants are transmitted during the switching pauses of the semiconductor switches, interference effects caused by switching operations of the semiconductor switches can advantageously be avoided. Interference due to the aforementioned displacement currents occurs namely only at times when the semiconductor switches are switching. If the time instant of the transmission is chosen such that no semiconductor switches are switching, the displacement currents are no longer able to disrupt the transmission of the control signal time instants.

A position and length of switching pauses of the semiconductor switches may be determined by the control logic in conjunction with the calculation of the control signal time instants, because a position of the switching points of the semiconductor switches and a time interval remaining therebetween in each case, and consequently direct information concerning position and length of the switching pauses, are present with the calculated control signal time instants. The transmission of the control signal time instants during the switching pauses of the semiconductor switches may thus be performed or initiated in a particularly favorable way by means of the control logic.

According to an advantageous feature of the present invention, the control signal time instants may be transmitted by the control logic to a control circuit on the high-voltage side of the drive control device, with the control circuit buffering the transmitted control signal time instants and comparing the buffered control signal time instants with the value of a timer, clock, counter or the like—referred to hereinafter in summary as a timer. A control signal is hereby generated by the control circuit based on the result of the comparison. Because the transmitted control signal time instants are buffered by the control circuit, the time of transmission of the control signal time instants is decoupled in time from the generation of one or more control signals. Interference-prone control signals no longer need to be transmitted directly from the low-voltage side to the high-voltage side and instead control signal time instants are transmitted as a basis for a later independent generation of control signals.

By transmitting the control signal time instants serially, well-known and low-cost elements can be used for the electronic components required for that purpose. A serial transmission furthermore permits a plurality of control signal time instants to be combined into a telegram. Known methods for detecting transmission errors can be employed for a telegram having one or more control signal time instants included therein, so that a repeat transmission can be initiated if errors are detected in a transmission. Specifically, consideration is given to protecting the data transmission by means of correctable codes, e.g. Reed-Solomon codes or the like.

According to an advantageous feature of the present invention, for transmitting the control signal time instants during the switching pauses of the semiconductor switches, a telegram having a plurality of control signal time instants may be transmitted at a midway point of a switching interval of the semiconductor switches. This avoids a time overlap in the transmission with the switching points of the semiconductor switches and any interference effects associated therewith. A switching interval is the time period between two switching points of a semiconductor switch. The switching interval therefore includes the switching pause. Depending on the length of the switching interval/switching pause of the semiconductor switches available for the transmission, in the serial transmission in form of two telegrams having control signal time instants distributed across the pause, one of the telegrams is transmitted at the start of a switching interval of the semiconductor switches and the other telegram being transmitted midway through the switching interval.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
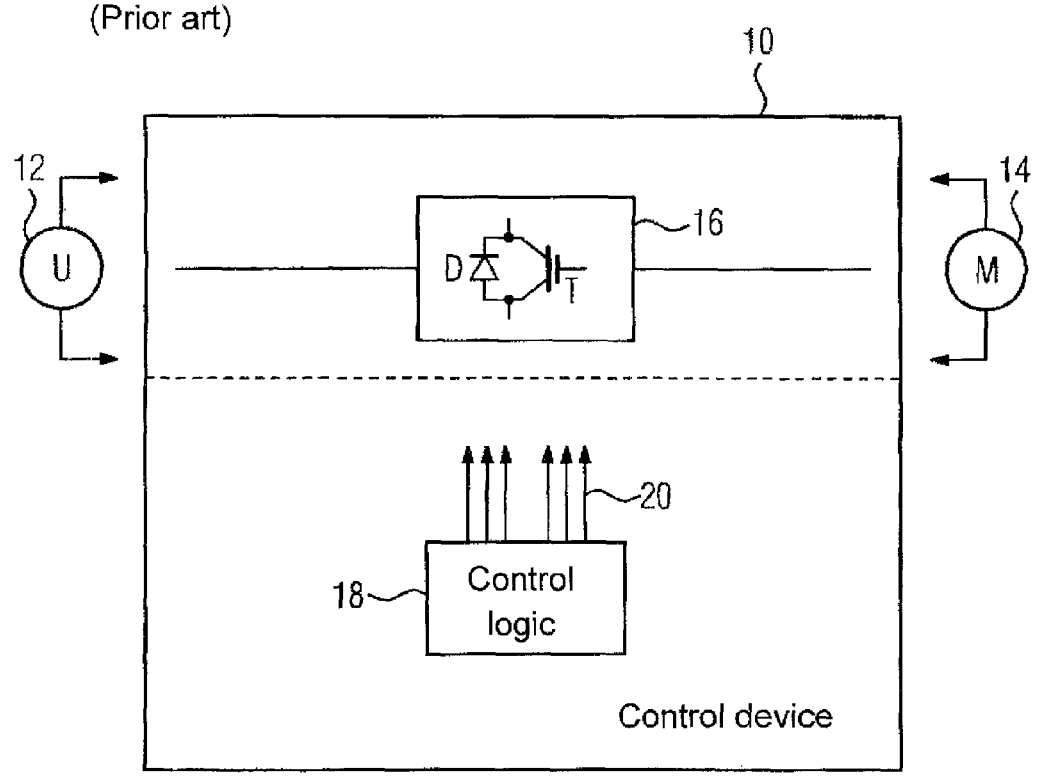
FIG. 1 shows a drive control device having an inverter on a high-voltage side and control logic for generating control signals for the inverter on a low-voltage side.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified schematic diagram of a drive control device 10 which is or can be connected to a voltage source 12 on the input side and to which a load 14 is or can be connected on the output side. The connected load 14 is for example a speed-regulated electric motor. The drive control device 10 comprises an inverter 16 having a per se known bridge circuit (shown only schematically), in particular in an embodiment as an IGBT B6 bridge, equipped with controllable semiconductor switches T and anti-parallel diodes D.

For the rotational speed regulation of e.g. electric motors as load 14, the inverter 16 generates an output voltage having variable frequency and voltage from an intermediate circuit direct-current voltage by appropriate switching of the semiconductor switches T. This enables the rotational speed and torque of electric motors to be adjusted and regulated.

Control logic 18 is provided for controlling the semiconductor switches T of the inverter 16. For each semiconductor switch T, the control logic 18 generates a control signal 20 which is transmitted to the respective semiconductor switch T. The inverter 16 is associated with a high-voltage side of the drive control device 10. The control logic 18, on the other hand, belongs to a low-voltage side of the drive control device 10. High-voltage and low-voltage side are separated in the diagram by means of a dashed line.

A means of electrical isolation is typically provided between the high-voltage and low-voltage side in order to encapsulate hazardous contact voltages of the high-voltage side. The control signals 20 for the semiconductor switches T have to be transmitted over and beyond said electrical isolation. Since it is necessary to transmit a multiplicity of control signals 20 during operation, the trend is toward implementing a serial transmission.

Figure 2:
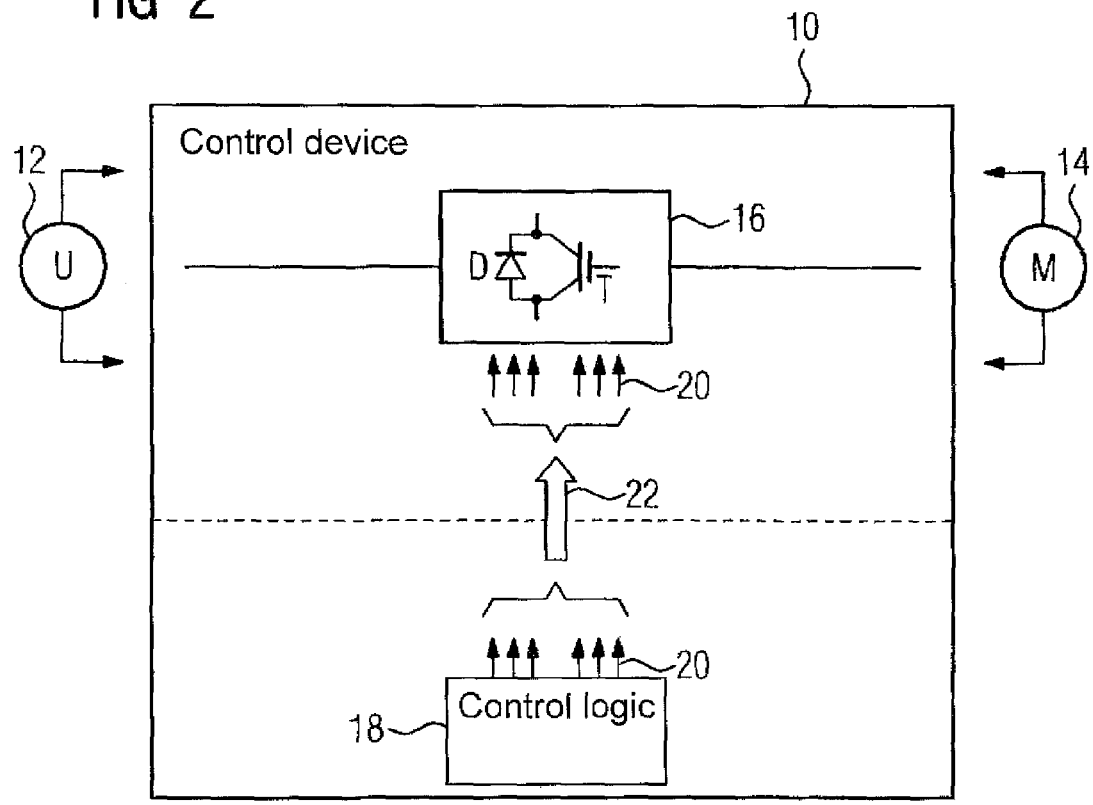
FIG. 2 shows a drive control device according to FIG. 1 in which the control signals are transmitted by way of a serial connection from the low-voltage side to the high-voltage side.

In this respect FIG. 2 shows—likewise in a schematically simplified view—the situation according to FIG. 1 in the case of a serial transmission of the control signals 20. The control signals 20 are no longer transmitted individually, but by way of a serial connection 22, shown here as a block arrow and otherwise known per se. The serial transmission 22 avoids otherwise necessary and expensive components for providing electrical isolation. Displacement currents nonetheless occur between the high-voltage and low-voltage side of the drive control device 10 due to the high voltage rates of rise during the switching of the semiconductor switches T. Said displacement currents can interfere with the serial transmission of the control signals 20 and lead to a situation where the semiconductor switches T can no longer be controlled correctly.

Figure 3:
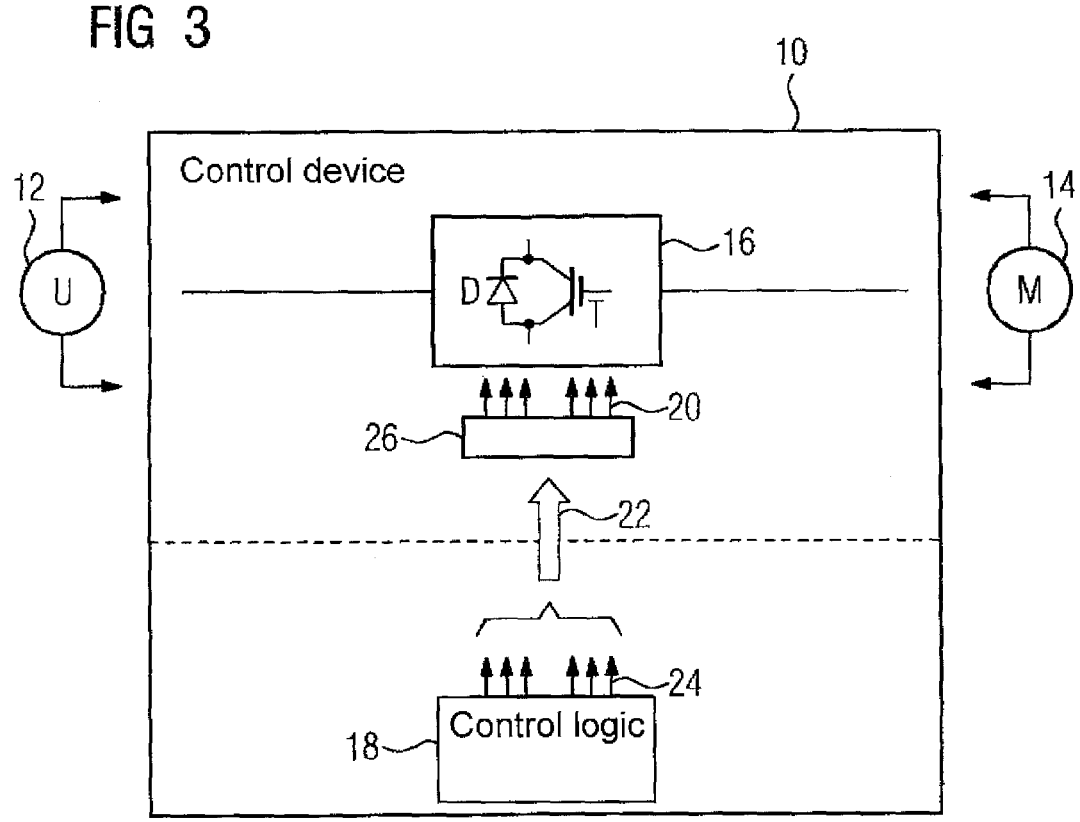
FIG. 3 shows a drive control device according to FIG. 1 in which control signal time instants serving as a basis for the control signals are transmitted from the low-voltage side to the high-voltage side by way of the serial connection to a control circuit.

FIG. 3 shows an embodiment variant of the drive control device 10 which can operate according to the method proposed here. In this case it is no longer the control signals 20 themselves that are transmitted, but rather time information relating to the time instants or the periodicity at which a control signal is to be generated. The information in question, designated here as control signal time instants 24, is ascertained by the control logic 18. The control signal time instants 24 are transmitted from the low-voltage side by way of the serial connection 22 to the high-voltage side and there to a control circuit 26. The latter includes a memory 30 (FIG. 4) in order to enable the control signal time instants 24 received by way of the serial connection 22 to be buffered. The control circuit 26 further comprises a processing unit 34 (FIG. 4) in the form or manner of a microprocessor and a timer 36 (FIG. 4), such that it is possible to compare the buffered control signal time instants 24 with a current value of the timer 36 at any given instant and to generate control signals 20 on the basis thereof.

Figure 4:
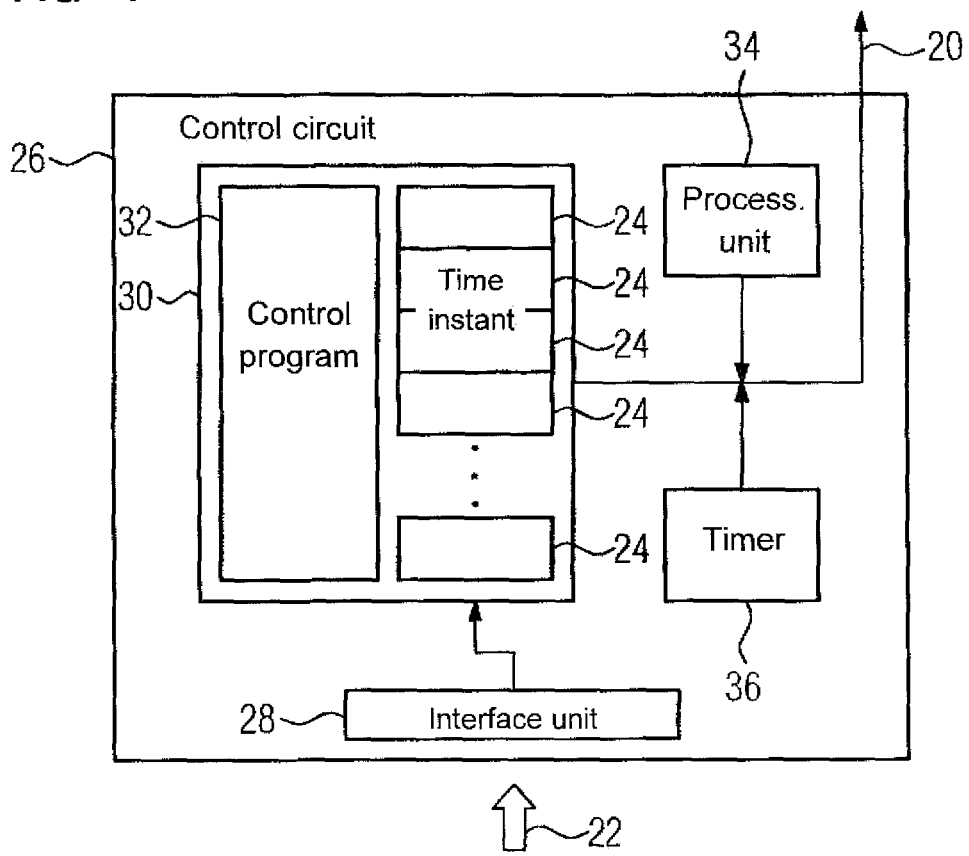
FIG. 4 shows details of the control circuit.

FIG. 4 shows the control circuit 26 with further details. According thereto, the control circuit 26 comprises an interface unit 28 for terminating a serial connection 22. A memory 30 is provided for buffering control signal time instants 24 received by way of the serial connection 22. Also stored in the memory 30 in addition to the control signal time instants 24 buffered there at any given instant is a control program 32 which determines the functionality of the control circuit 26. During the operation of the drive control device 10 or the control circuit 26, the control program 32 is executed by means of a processing unit 34 provided for that purpose. In this case the processing unit 34 compares a value of the buffered control signal time instants 24 with a time value supplied by a timer 36. Depending on the result of the comparison, in other words e.g. if the values match, the control signal 20 associated with the respective control signal time instant 24 is generated. An assignment in this regard can be made on the basis that the buffered control signal time instants 24 are stored in the memory 30 in a fixed sequence and a control signal 20 provided for controlling a first semiconductor switch T is generated if the buffered control signal time instant 24 stored in a first storage location of the memory 30 coincides with the current value of the timer 36. This scheme can be continued for a second storage location and a control signal 20 provided for controlling a second semiconductor switch, and so on.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a drive control device having an inverter with semiconductor switches having switching times controlled by control signals, the method comprising the steps of:
    determining with a control logic a temporal position of the switching times and pauses between the switching times,
    determining with the control logic a control signal time instant for each control signal,
    during operation, serially transmitting the control signal time instants with the control logic during the switching pauses from a low-voltage side of the drive control device to a high-voltage side of the drive control device having the inverter in form of a telegram at a midpoint of a switching pause, and
        generating the control signals for controlling the semiconductor switches on the high-voltage side based on the transmitted control signal time instants.

2. The method of claim 1, further comprising the steps of:
    transmitting with the control logic the control signal time instants to a control circuit on the high-voltage side of the drive control device,
    buffering with the control circuit the transmitted control signal time instants,
    comparing with the control circuit the buffered control signal time instants with a value from a timer, and
    generating the control signals based on a result of the comparison.

3. The method of claim 1, wherein the control signal time instants are transmitted serially in form of exactly one telegram at the midpoint of a switching pause of the semiconductor switches.

4. The method of claim 1, wherein the control signal time instants are transmitted serially in form of exactly two telegrams having control signal time instants distributed among the two telegrams, with one of the two telegrams being transmitted at a start of a switching pause and the other of the two telegrams being transmitted at the midpoint of the switching pause.

5. A drive control device, comprising:
    a control logic,
    a control circuit connected to the control logic for communication, and
    an inverter comprising semiconductor switches controlled by control signals from the control circuit,
    wherein the control logic is configured to
    determine with a control logic a temporal position of the switching times and pauses between the switching times,
    determine control signal time instants controlling the semiconductor switches,
    serially transmit the control signal time instants to the control circuit during the switching pauses from a low-voltage side of the drive control device to a high-voltage side of the drive control device having the inverter in form of a telegram at a midpoint of a switching pause, and
    generate the control signals for controlling the semiconductor switches on the high-voltage side based on the control signal time instants.

6. The drive control device of claim 5, further comprising a memory, a processing unit, and a timer, wherein the processing unit compares the control signal time instants with a time value supplied by the timer, and generates a control signal for controlling a semiconductor switch based on a result of the comparison.

7. The drive control device of claim 6, wherein the control signal time instants are buffered in the memory.

8. A computer program having program code stored on a non-transitory medium, wherein the program code, when loaded into a drive control device having an inverter with semiconductor switches controlled by control signals and executed on the drive control device, causes the drive control device to
    determine with a control logic a temporal position of the switching times and pauses between the switching times,
    determine with the control logic a control signal time instant for each control signal,
    during operation, serially transmit the control signal time instants with the control logic during the switching pauses from a low-voltage side of the drive control device to a high-voltage side of the drive control device having the inverter in form of a telegram at a midpoint of a switching pause, and
    generate the control signals for controlling the semiconductor switches on the high-voltage side based on the transmitted control signal time instants.

* * * * *